(12) United States Patent
McMichael

(10) Patent No.: US 10,591,740 B2
(45) Date of Patent: Mar. 17, 2020

(54) LENS ASSEMBLY FOR A LIDAR SYSTEM

(71) Applicant: Panosense, Inc., Menlo Park, CA (US)

(72) Inventor: Ryan McMichael, Mountain View, CA (US)

(73) Assignee: Panosense Inc., Foster City, CA (US)

( * ) Notice: Subject to any disclaimer, the term of this patent is extended or adjusted under 35 U.S.C. 154(b) by 339 days.

(21) Appl. No.: 15/486,830

(22) Filed: Apr. 13, 2017

(65) Prior Publication Data

US 2018/0188545 A1 Jul. 5, 2018

Related U.S. Application Data

(60) Provisional application No. 62/440,951, filed on Dec. 30, 2016.

(51) Int. Cl.
| | |
|---|---|
| *G02B 27/09* | (2006.01) |
| *G01S 17/89* | (2020.01) |
| *G01S 7/481* | (2006.01) |
| *G01S 17/42* | (2006.01) |
| *G02B 3/04* | (2006.01) |

(52) U.S. Cl.
CPC .......... *G02B 27/0955* (2013.01); *G01S 7/481* (2013.01); *G01S 7/4811* (2013.01); *G01S 17/42* (2013.01); *G01S 17/89* (2013.01); *G02B 3/04* (2013.01); *G02B 27/0916* (2013.01); *G02B 27/0927* (2013.01)

(58) Field of Classification Search
CPC ...... G01S 7/4811; G01S 7/4817; G01S 7/497; G01S 17/42; G01S 17/48; G01S 17/89; G01S 17/936; G01S 17/88; G01S 17/46; G02B 26/10
See application file for complete search history.

(56) References Cited

U.S. PATENT DOCUMENTS

| | | | |
|---|---|---|---|
| 3,790,277 A | 2/1974 | Hogan | |
| 4,154,529 A | 5/1979 | Dyott | |
| 4,516,158 A | 5/1985 | Grainge et al. | |
| 4,700,301 A | 10/1987 | Dyke | |

(Continued)

FOREIGN PATENT DOCUMENTS

| | | |
|---|---|---|
| DE | GB2276997 A | 10/1994 |
| EP | 2410358 A1 | 1/2012 |

(Continued)

OTHER PUBLICATIONS

U.S. Appl. No. 14/462,075, filed Aug. 18, 2014, Pennecot et al., "Devices and Methods for a Rotating LIDAR Platform with a Shared Transmit/Receive Path," 55 pages.

(Continued)

*Primary Examiner* — Luke D Ratcliffe
(74) *Attorney, Agent, or Firm* — Lee & Hayes, P.C.

(57) ABSTRACT

A LIDAR system may include a laser diode that emits a beam having a slow axis and a fast axis so that a cross-section of the beam has a width substantially greater than a height. A first three-element lens may be optically aligned with a photodetector of the LIDAR system. A second three-element lens may be optically aligned with the diode laser. The second three-element lens may include at least one lens having a predetermined astigmatism that reduces the width of the beam with respect to the height.

20 Claims, 6 Drawing Sheets

(56) References Cited

U.S. PATENT DOCUMENTS

| | | | |
|---|---|---|---|
| 4,709,195 | A | 11/1987 | Hellekson et al. |
| 5,098,185 | A | 3/1992 | Watanabe et al. |
| 5,202,742 | A | 4/1993 | Frank et al. |
| 5,303,084 | A | 4/1994 | Pflibsen et al. |
| 5,337,189 | A | 8/1994 | Krawczyk et al. |
| 5,428,438 | A | 6/1995 | Komine |
| 5,703,351 | A | 12/1997 | Meyers |
| 5,805,275 | A * | 9/1998 | Taylor .................. G01S 7/4811 356/3.16 |
| 6,046,800 | A | 4/2000 | Ohtomo et al. |
| 6,115,128 | A | 9/2000 | Vann |
| 6,778,732 | B1 | 8/2004 | Fermann |
| 7,089,114 | B1 | 8/2006 | Huang |
| 7,248,342 | B1 | 7/2007 | Degnan |
| 7,255,275 | B2 | 8/2007 | Gurevich et al. |
| 7,259,838 | B2 | 8/2007 | Carlhoff et al. |
| 7,311,000 | B2 | 12/2007 | Smith et al. |
| 7,361,948 | B2 | 4/2008 | Hirano et al. |
| 7,417,716 | B2 | 8/2008 | Nagasaka et al. |
| 7,544,945 | B2 | 6/2009 | Tan et al. |
| 7,969,558 | B2 | 6/2011 | Hall |
| 8,050,863 | B2 | 11/2011 | Trepagnier et al. |
| 8,477,290 | B2 | 7/2013 | Yamada |
| 8,675,181 | B2 | 3/2014 | Hall |
| 8,742,325 | B1 | 6/2014 | Droz et al. |
| 8,767,190 | B2 | 7/2014 | Hall |
| 8,836,922 | B1 | 9/2014 | Pennecot et al. |
| 9,086,273 | B1 | 7/2015 | Gruver et al. |
| 9,285,464 | B2 | 3/2016 | Pennecot et al. |
| 9,368,936 | B1 | 6/2016 | Lenius et al. |
| RE46,672 | E | 1/2018 | Hall |
| 2002/0140924 | A1 | 10/2002 | Wangler et al. |
| 2008/0316463 | A1 | 12/2008 | Okada et al. |
| 2010/0220141 | A1 | 9/2010 | Ozawa |
| 2010/0302528 | A1 | 12/2010 | Hall |
| 2011/0216304 | A1 * | 9/2011 | Hall ..................... G01S 7/4813 356/4.01 |
| 2011/0255070 | A1 | 10/2011 | Phillips et al. |
| 2015/0293228 | A1 | 10/2015 | Retterath et al. |
| 2016/0004073 | A1 * | 1/2016 | Kipfer .................. G01S 17/023 359/425 |
| 2016/0047901 | A1 | 2/2016 | Pacala et al. |
| 2017/0269340 | A1 * | 9/2017 | Shmunk ............. G02B 13/0055 |

FOREIGN PATENT DOCUMENTS

| | | |
|---|---|---|
| WO | WO03073123 | 9/2003 |
| WO | WO2012172526 A1 | 12/2012 |

OTHER PUBLICATIONS

Efficient Power Conversion, Why GaN circuits make better Lidar, retrieved on Mar. 3, 2017 at <<http://epc-co.com/epc/DesignSupport/TrainingVideos/eGaNDemos/GaN-circuits-make-better-LiDAR.aspx>> 2 pages.

Notice of Allowance from the U.S. Patent and Trademark Office for U.S. Appl. No. 14/462,075, dated Nov. 18, 2015. 8 pages.

Office Action from the U.S. Patent and Trademark Office ofr U.S. Appl. No. 14/462,075, dated Jun. 17, 2015. 14 pages.

The PCT Search Report and Written Opinion dated Nov. 19, 2014 for PCT Application No. PCT/US2014/047864, 12 pages.

Rim et al., "The optical advantages of curved focal plane arrays," Optics Express, vol. 16, No. 7, Mar. 31, 2008, 1 page.

Xu et al., "A calibration method of the multi-channel imaging lidar," Proceedings SPIE 9080, Laser Radar Technology and Applications XIX; and Atmospheric Propagation XI, 90800V, Jun. 9, 2014, 2 pages.

The PCT Search Report and Written Opinion dated Mar. 23, 2018 for PCT application No. PCT/US2017/168289, 12 pages.

* cited by examiner

⟵ 1000 

PLACE A FIRST THREE-LENS GROUP INTO A FIRST PORTION OF A LENS HOLDER SO THAT THE FIRST THREE-LENS GROUP IS OPTICALLY ALIGNED WITH A LASER DIODE, WHEREIN A BEAM OF THE LASER DIODE DIVERGES IN AN ASYMMETRICAL PATTERN
1002

↓

PLACE A SECOND THREE-LENS GROUP INTO A SECOND PORTION OF THE LENS HOLDER SO THAT THE SECOND THREE-LENS GROUP IS OPTICALLY ALIGNED WITH A PHOTODETECTOR, WHEREIN THE FIRST THREE-LENS GROUP INCLUDES AT LEAST ONE LENS HAVING A PREDETERMINED ASTIGMATISM THAT REDUCES ASYMMETRY OF THE ASYMMETRICAL PATTERN OF THE BEAM
1004

FIG. 10

LENS ASSEMBLY FOR A LIDAR SYSTEM

CROSS-REFERENCE TO RELATED APPLICATION

This application claims priority to U.S. Provisional Application No. 62/440,951, filed on Dec. 30, 2016, entitled "Lens Assembly for a LIDAR System," which are hereby incorporated by reference in their entirety for all purposes.

BACKGROUND

The term "LIDAR" refers to a technique for measuring distances of visible surfaces by emitting light and measuring properties of the reflections of the emitted light.

A LIDAR system has at least one light emitter and a corresponding light sensor. The light emitter may comprise a laser that directs light in the direction of an object or surface. The light sensor may comprise a photodetector, such as a photomultiplier or avalanche photodiode (APD), that converts light intensity to a corresponding electrical signal. Optical elements such as lenses may be used in the light transmission and reception paths to focus light, depending on the particular nature of the LIDAR system.

A LIDAR system has signal processing components that analyze reflected light signals to determine the distances to surfaces from which the emitted laser light has been reflected. For example, the system may measure the "flight time" of a light signal as it travels from the laser, to the surface, and back to the light sensor. A distance is then calculated based on the flight time and the known speed of light.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 10 is a flow diagram illustrating a process for fabricating a lens module for a LIDAR system, according to some examples.

DETAILED DESCRIPTION

Figure 1:
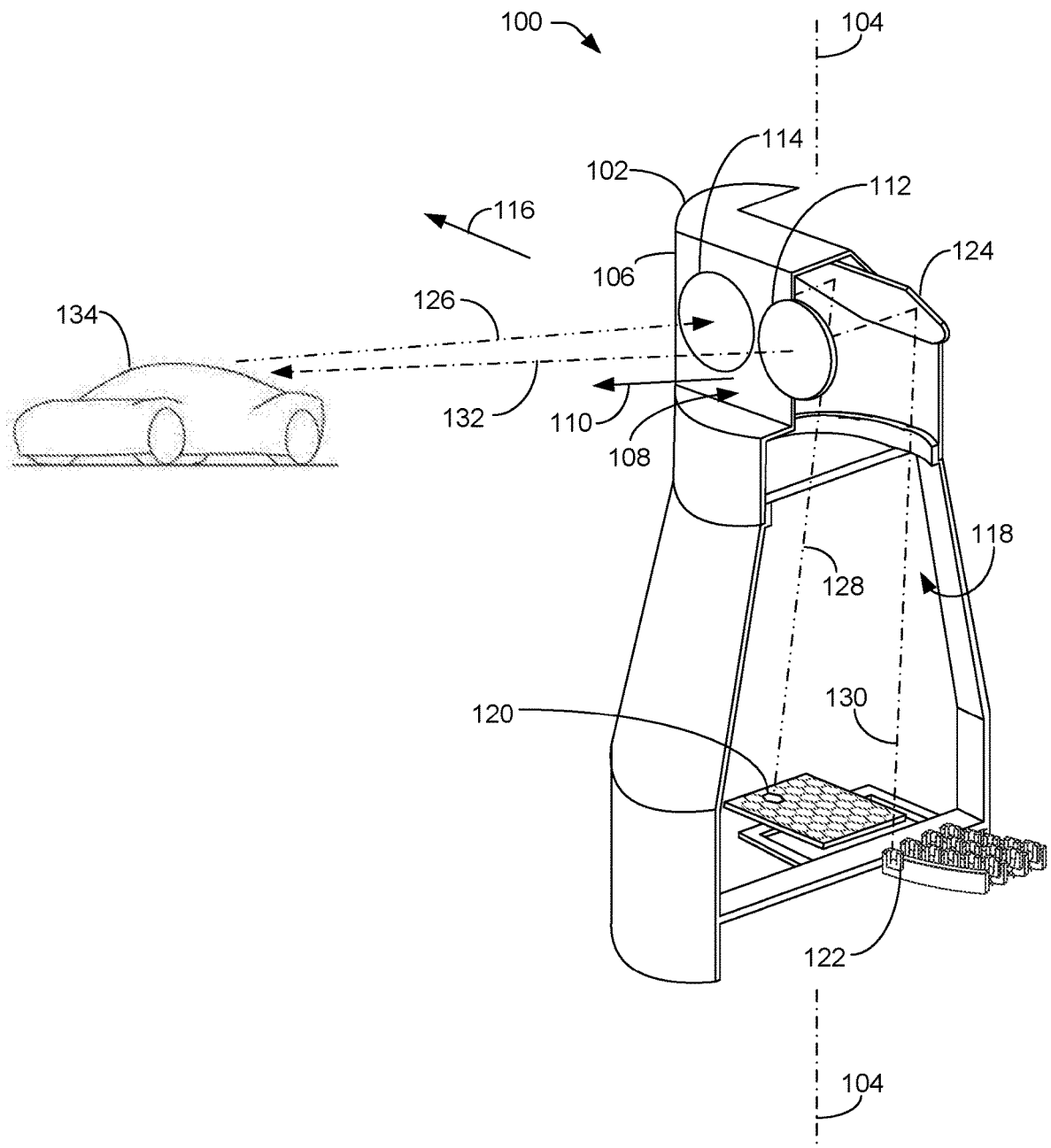
FIG. 1 is a perspective schematic diagram depicting an example LIDAR system and detectable object.

As discussed above, LIDAR systems may measure the "flight time" of a light signal as it travels from a laser, to a surface, and back to a light sensor. A distance is then calculated based on the flight time and the known speed of light. Generally, limitations of performance of components of the optical system of a LIDAR system may affect the accuracy or dependability of the distance calculations. For example, some existing LIDAR systems may have limited distance detection and/or may have a relatively larger size to accommodate more or less efficient optical components. Improvements to a LIDAR system may be realized by, for example, incorporating an optical system that introduces astigmatism to shape a beam emitted by the laser of the LIDAR system (e.g., a more-focused beam and better distance/range may be realized for such a LIDAR system). In some examples, a freeform lens surface may be used to introduce beam-shaping astigmatism. In such examples, additional optical elements need not be added to an optical system, and thus a sensor assembly of a LIDAR system may be relatively small.

Examples herein describe an optical system that includes, among other things, a Cooke triplet lens or other three-element group that has a freeform surface. Such an optical system may be used to shape the beam of a laser diode, for example, which typically produces a beam that diverges at different rates in different axes. Such an optical system may be well-suited for use in any of a variety of applications, particularly those that incorporate laser diodes. An example of such an application, is a LIDAR system, which may be used in various types of machine vision systems to produce point clouds indicating three-dimensional coordinates of surfaces that are visible from the perspective of the LIDAR system. As an example, a LIDAR system may be used by guidance, navigation, and control systems of autonomous vehicles such as automobiles, aircraft, boats, etc.

Generally, a lens having a freeform surface may include digitally generated curves that render biconic, rotationally asymmetric, or atoric surfaces, just to name a few examples. This is in contrast to spherical lens surfaces, for instance. As used herein, a biconic surface is a surface having two differing curvatures along a first axis and a second axis, and a biconic lens is a lens which includes a biconic surface or which has similar properties (e.g., providing differing focal lengths in different axes).

In some examples, a LIDAR system includes a rotatable chassis that houses components that implement a LIDAR measurement system. The chassis is configured to rotate about a vertical rotational axis to allow the system to scan horizontally across a field of view. During rotation, laser light may be emitted at various vertical and horizontal directions. The vertical angle of light emission may be varied by using lasers that are at different positions within the chassis. The horizontal angle of light emission varies with the rotation of the chassis.

The LIDAR system may have one or more lenses that define a field of view of a scene surrounding the system. As the chassis rotates, the field of view moves or scans horizontally. The lasers may be positioned within the chassis to project laser light outward through the one or more lenses and into the field of view. Multiple photodiodes may be positioned so that reflected light originating from any particular laser and reflected off an object transmits through the one or more lenses to a corresponding photodiode in the LIDAR system.

In some particular examples, the lasers and photodiodes, or any other type of photo-sensitive detector, may have arrangements that are similar or identical to one another. The photodiodes may be arranged within a sensor image frame having an x-axis that corresponds to the horizontal axis of the scene and an orthogonal y-axis that corresponds to the vertical axis of the scene. Because the rotation of the chassis causes the field of view to scan horizontally, the horizontal axis and the x-axis of the sensor image frame may be referred to as the scan axis. During rotation, an image of the scene translates along the scan axis over the sensor image frame. In some embodiments, the chassis may have a rotational axis that is not vertical, and the scan or x direction may therefore not always correspond to horizontal, with respect to gravity.

FIG. 1 illustrates an example configuration of a rotatable sensor assembly 100 that may be used as part of a LIDAR sensor device or system. Sensor assembly 100 may include a rotatable chassis 102 that rotates about rotational axis 104. In some examples, the rotational axis is vertical with respect to gravity. In other examples, the rotational axis may be tilted at an angle from vertical.

The chassis 102 has an outer contour that is generally symmetrical about the rotational axis 104. An upper portion 106 of chassis 102 includes a cutout forming a vertically oriented flat surface 108 that faces in a forward direction 110, also referred to as the z-direction, relative to the housing 102. In some implementations, flat surface 108 has one or more openings to accommodate first lens 112 and second lens 114. Forward direction 110 may be parallel with a direction that first lens 112 and second lens 114 face. In other implementations, flat surface 108 is configured to accommodate mounting of a lens holder (not illustrated in FIG. 1) that supports first and second lenses 112 and 114.

Lenses 112 and 114 may be mounted so that their principal axes are generally perpendicular to rotational axis 104, and generally parallel to forward direction 110. In practice, each of lenses 112 and 114 may comprise a Cooke triplet lens or other type of lens group, and may therefore have multiple individual lens elements, as described in detail below.

Lenses 112 and 114 may have a common field of view of a scene. Rotation of chassis 102 causes the field of view to move or scan in a scan direction 116. In the illustrated embodiment, in which rotational axis 104 is vertical, scan direction 116 is horizontal.

Chassis 102 may include a partition wall 118 that forms a sensor compartment on one side of chassis 102 and a laser compartment on the other side of chassis 102. Partition wall 118 may prevent or reduce stray light inside chassis 102. Such stray light may undesirably lead to false electronic signals. The sensor compartment houses an array of light sensors 120. The laser compartment houses one or more rows of laser light sources 122.

In some examples, light sensors 120 may be arranged to have a uniform spacing or pitch. For instance, light sensors 120 may be arranged as a series of staggered rows that are tilted slightly in a first direction to produce a uniform pitch in an orthogonal direction.

Laser light sources 122, generally laser diodes, may be arranged within an emitter image frame. Lenses 112 and 114 may direct light produced by the laser light sources 122 from the laser image frame outwardly into the lenses' field of view.

Light sensors 120 may be mounted on a single, planar printed circuit board. Laser light sources 122, however, may be mounted on multiple printed circuit boards. Each printed circuit board supports a corresponding row of laser light sources 122, which may be mounted on edges of the boards and emit toward lenses 112 and 114. The edges may be curved and the printed circuit boards may be inclined inwardly with respect to one another so that laser light sources 122 are all equidistant from a lens focal point and are also all directed to converge at the lens focal point.

First lens 112 is generally above the laser compartment and forward of laser light sources 122. Second lens 114 is generally above the sensor compartment and forward of the light sensors 120.

One or more mirrors 124 are positioned within the chassis 102 behind lenses 112 and 114 to redirect or fold emitted and received light between nominally horizontal and vertical directions. Received light 126 enters the chassis generally horizontally through lens 114 and is redirected as downward light 128 by the one or more mirrors 124 toward the light sensor 120. Laser light sources 122 emit laser light 130 in an upward direction. The emitted light impinges on the one or more mirrors 124 and is redirected horizontally, in forward direction 110 through lens 112, producing an outward beam 132.

The LIDAR system may be used to sense any of a number of parameters for an object 134 in a field of view. Such parameters may include distances to various points of the object to determine 3D coordinates of its surface, for example. Sensing an object involves reflecting at least a portion of outward beam 132 from the object and receiving the reflected light 126 at light sensors 120.

In some particular examples, each of laser light sources 122 are fired individually and in sequence to obtain individual distance measurements. For each measurement, a single laser is fired in a burst of two closely spaced pulses and a return reflection is detected by a corresponding light sensor 120 (e.g., a photodiode). The light sensor creates a return signal representing the intensity of the reflected light over time. Assuming the emitted burst has been reflected, the return signal comprises a pair of pulses, similar in shape to the emitted pulses, that are delayed with respect to the emitted pulses. Among a number of other techniques, a cross correlation may be performed between the return signal and a reference signal to determine a time delay. In some examples, another technique for determining time delay may involve Gaussian or polynomial regression of the pulse shape of the return signal. The peak of the auto-correlation is identified, and the timing of the peak is used to determine the round-trip travel time of the emitted burst. In other examples, any number of one or more pulses may be used.

In examples using multiple pulses, the amount by which the pulses of a burst are spaced from each other may be varied over time and between lasers to reduce an impact of cross-talk. Cross-talk may occur, for example, when a photodiode receives a reflection of light that was emitted by a non-corresponding laser, or when a photodiode receives light that was emitted from another LIDAR apparatus. Varying the pulse spacing may reduce ambiguity between different light emissions, so that the cross-correlation inherently tends to mask out reflected bursts whose spacings are different than the spacing of the originally emitted burst. The spacing may be varied across the different lasers and also may be varied over time for an individual laser. For example, the pulse spacing for a particular laser may be changed randomly for every rotation of chassis 102.

The lasers may be sequentially fired in a defined sequence at a rate such that each laser is fired during the maximum expected flight time of a previously fired laser. Thus, two laser emissions (where each emission is a pulse pair) may be "in flight" at any given time.

Two analog to digital converters (ADCs) may be used to digitize signals produced by light sensors 120. The ADCs operate in an alternate fashion, so that a particular ADC digitizes every other laser emission. For example, the reflection from a first laser burst is digitized by a first ADC, the reflection corresponding to a second laser burst is digitized by a second ADC, the reflection corresponding to a third laser burst is digitized by the first ADC, the reflection corresponding to a fourth laser burst is digitized by the second ADC, and so on. Two ADCs may be adequate because only two laser emissions are in flight at any given time, in this example.

Each laser (among laser light sources 122) may be associated with a pair of capacitors that are used to generate two energy pulses for a corresponding individual laser emission. The capacitors of each pair may be charged in common by a regular boost circuit, and discharged into the corresponding laser using a pair of gallium nitride field-effect transistors (GaN FETs). Laser light sources 122 may be divided into two charge banks. The capacitors corresponding to the lasers of one charge bank may be charged while the lasers of the other charge bank are being fired.

A firing order of the lasers may be selected to maximize the physical distance between adjacently-fired lasers, subject to constraints that (a) adjacently-fired lasers should correspond to photodiodes of different ADC groups and (b) the sequence should repeatedly fire all the lasers of the first charge bank and then all the lasers of the second charge bank. Each charge bank may include lasers corresponding to photodiodes of both ADC groups.

Figure 2:
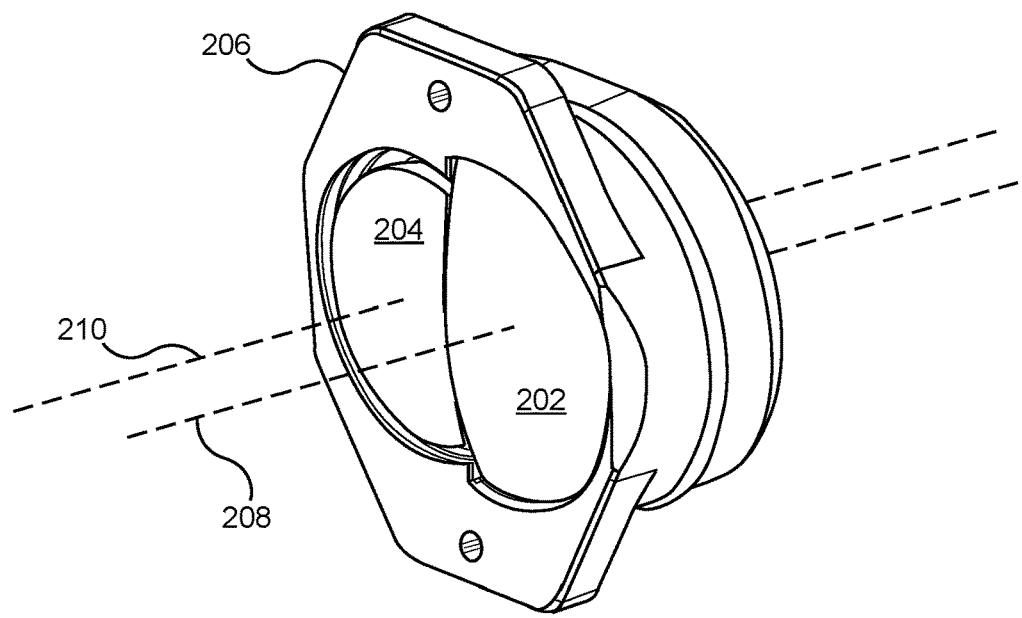
FIG. 2 is a perspective schematic diagram depicting lenses in a lens module, according to some examples.

FIG. 2 is a perspective schematic diagram depicting lenses 202 and 204 in a lens module 206, according to some examples. Such a lens module 206 may include a lens holder that is the same as or similar to a lens holder that is mountable onto flat surface 108, as mentioned above for FIG. 1. In some cases, lenses 202 and/or 204 may be less than a full circle such that portions of the circumferences of the lenses that are closest together are truncated so they can be closer together. In other words, centers of lenses 202 and/or 204 may be less than one diameter apart from each other. Each of lens 202 and lens 204 may be a Cooke triplet lens or other type of lens group. For example, lens 202 may be the same as or similar to lens 112, and lens 204 may be the same as or similar to lens 114, as described for FIG. 1. An optical axis 208 is depicted for lens 112 and an optical axis 210 is depicted for lens 114.

Figure 3:
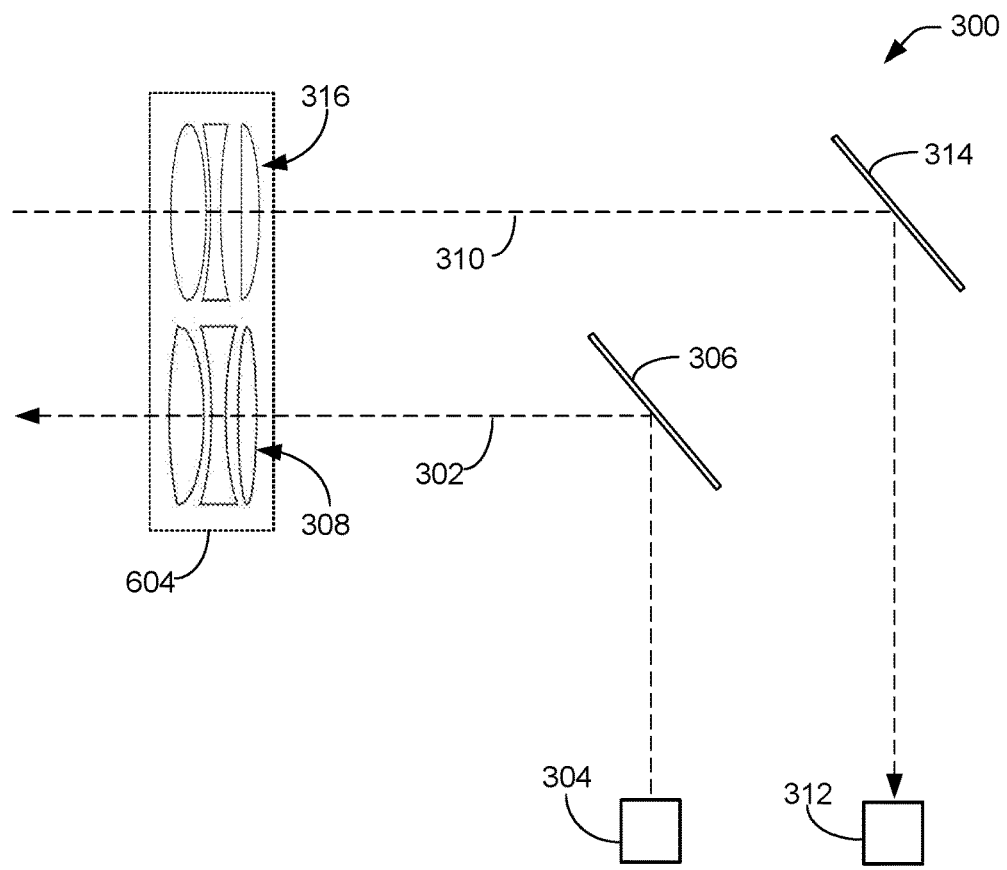
FIG. 3 is a schematic diagram depicting an optical configuration for an example LIDAR system.

FIG. 3 is a schematic diagram depicting an optical configuration 300 for an example LIDAR system. Optical configuration 300 may include a first optical path 302 that involves a laser 304, a beam-steering mirror 306, and a first lens group 308, which may be a Cooke lens or other three-element system, for example. Such an optical configuration may be the same as or similar to that involving laser light source 122, mirror 124, and lens 112, as illustrated in FIG. 1. Optical configuration 300 may include a second optical path 310 that includes a light-sensitive detector 312 (e.g., a photodiode), a beam-steering mirror 314, and a second lens group 316, which may be a Cooke lens or other three-element system, for example. In some examples, beam-steering mirror 306 and beam-steering mirror 314 may comprise a single mirror, such as mirror 124 illustrated in FIG. 1, for example. Of course, lens groups 308 and 316 may comprise any number of optical elements, and claimed subject matter is not limited in this respect. Such an optical configuration may be the same as or similar to that involving light sensor 120, mirror 124, and lens 114, as illustrated in FIG. 1. First lens group 308 and second lens group 316 may be supported by a lens holder of a lens module 318, which may be the same as or similar to 206, illustrated in FIG. 2.

In some examples, first lens group 308 may include a freeform lens, as described below. Such a lens group may have an intentionally-designed astigmatism that desirably shapes the beam of laser 304, which typically emits an undesirably non-circular (cross-section) beam.

Figure 4:
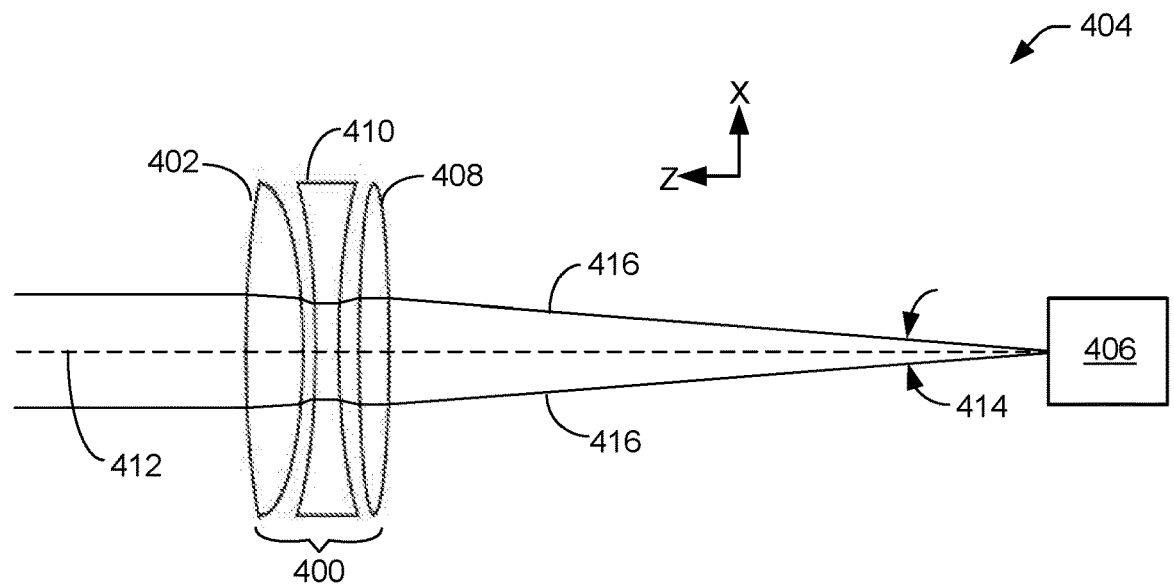
FIG. 4 is a schematic side view of a laser diode and three-element lens, according to some examples.
Figure 5:
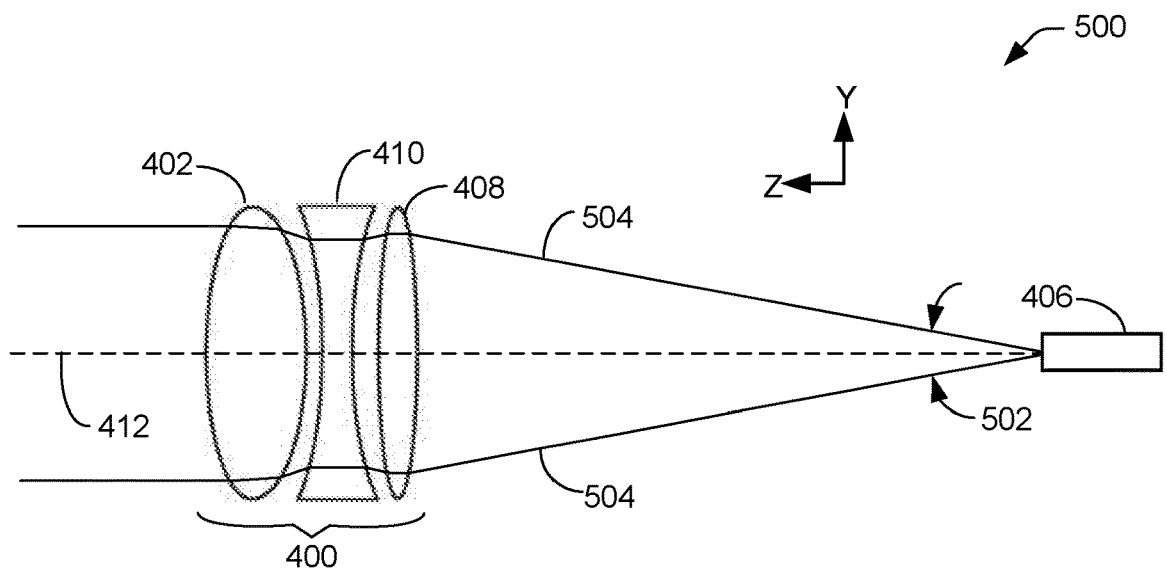
FIG. 5 is a schematic top view of the laser diode and three-element lens of FIG. 4, according to some examples.

FIGS. 4 and 5 illustrate differences between an optical profile of a laser diode and freeform lens in a first plane, and those in a second plane perpendicular to the first plane. Hereinafter, for sake of clarity, the first plane is called "horizontal direction" and the second plane is called "vertical direction". Such differences arise, at least in part, because a beam produced by a laser diode generally diverges at a greater angle in the horizontal direction as compared to the vertical direction. Such a divergence difference arises from the horizontally-oriented geometry of the optical cavity of the laser diode. For example, divergence in the horizontal direction of a beam of a laser diode may be about 10 degrees and the divergence in the vertical direction may be about 30 degrees. In such a case, the horizontal direction of the beam may be regarded as a slow axis and the vertical direction of the beam may be regarded as a fast axis.

In some examples, to accommodate differences of beam divergence in difference directions, a lens group, such as a Cooke triplet lens, may include at least one lens element (e.g., the Cooke triplet lens comprising three such lens elements) having a freeform surface. In some particular examples, a Cooke triplet lens may include at least one lens element that is a rotationally asymmetric lens, as described below. Examples illustrated in FIGS. 4 and 5 are directed to the former examples of a lens group 400 having a freeform lens element 402. Herein, the name "Cooke triplet lens" refers to a three-element group comprising a negative lens between two positive lenses, and need not refer to particular characteristics of a Cooke triplet that comprises specific lens materials or has specific optical properties. For example, in some situations a Cooke triplet may be designed to be achromatic so as to operate over a broad spectrum, and the individual lenses of the Cooke triplet may comprise different materials. Herein, a Cooke triple lens or three-element group may operate with monochromatic light (e.g., laser light). Accordingly, the Cooke triple lens or the three-element group may include individual lenses having the same materials, though this need not be the case.

Optical parameters of lens group 400 include entrance pupil diameter, field of view, a focal length, and operable spectral range, just to name a few examples. In particular examples, considered individually, values or ranges of optical parameters are as follows. Entrance pupil diameter may be up to about 35 millimeters. Field of view may be up to about 25 degrees. Focal length may be in a range between about 20 millimeters and 200 millimeters, and f-number may be greater than about 2. Lens group 400 may be configured to operate in a spectral range from about 800 nanometers to about 1000 nanometers (e.g., and optimized for about 905 nanometers). Of course, such values are merely examples, and claimed subject matter is not limited in this respect.

FIG. 4 is a schematic side view 404 in the horizontal direction of a laser diode 406 and lens group 400, according to some examples. X-Z axes are illustrated for reference. Lens group 400 includes three individual lens elements: a first convex lens 408, a middle negative or concave lens 410, and a freeform convex lens 402. An optical axis 412 is illustrated for the laser-diode/lens-group system. First convex lens 408 is the lens element of the lens group that is closest to laser diode 406 (thus the identifier "first").

In the horizontal direction (X-Z plane) illustrated in FIG. 4, laser diode 406 emits a beam that diverges at a relatively small angle 414, by an amount indicated by beam outline 416. Lens group 400 collimates the beam to a particular focal length.

FIG. 5 is a schematic top view 500 in the vertical direction of laser diode 406 and lens group 400 of FIG. 4. Y-Z axes are illustrated for reference. In the vertical direction (Y-Z plane), laser diode 406 emits a beam that diverges at a relatively large angle 502, by an amount indicated by beam outline 504. Freeform convex lens 402 of lens group 400 collimates the beam to a particular focal length, which may be substantially the same as the focal length of the collimated beam in the horizontal direction. Freeform convex lens 402 is curved by a relatively large amount in the Y-direction compared to the curvature in the X-direction. The greater curvature allows for collimating the relatively large divergence angle of the beam in the vertical direction.

FIGS. 6-9 are schematic views of various example three-element lenses. In these examples, the middle lens element is a negative (e.g., concave) lens. The two outer lens elements are positive (e.g., convex) lenses. These illustrated examples are intended to demonstrate that a freeform three-element lens as described herein may include any number of combinations of lens surface curvatures, ordering, separations, and lens element types.

Figure 6:
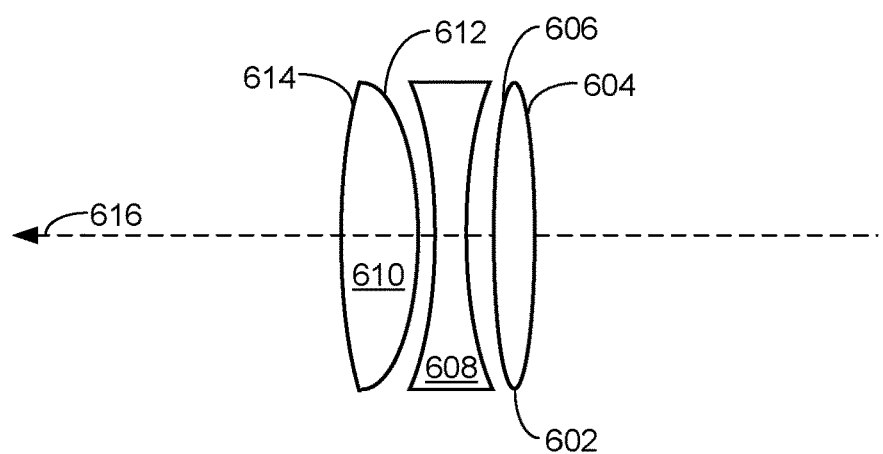
FIGS. 6-9 are schematic views of various example three-element lenses usable in LIDAR systems.

FIG. 6 illustrates a lens group 600 (e.g., a three-element lens or Cooke triplet lens) that includes a first lens element 602 having a first surface 604 and a second surface 606, a negative lens 608, and a second lens element 610 having a first surface 612 and a second surface 614. An optical axis 616 of lens group 600 is illustrated. In some examples, second lens element 610 is a freeform lens where the second surface 614 is non-spherical, and may have a biconic or a rotationally asymmetric shape.

Figure 7:
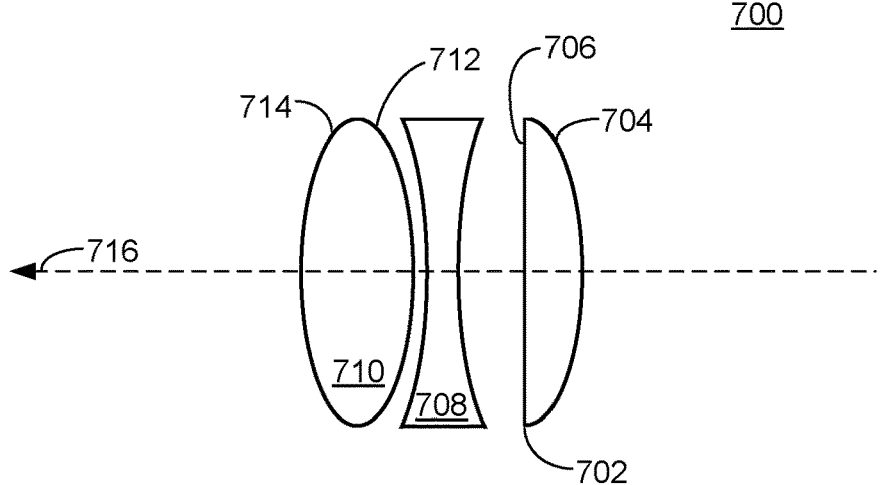

FIG. 7 illustrates a lens group 700 (e.g., a three-element lens or Cooke triplet lens) that includes a first lens element 702 having a first surface 704 and an opposite flat surface 706, a negative lens 708, and a second lens element 710 having a first surface 712 and a second surface 714. An optical axis 716 of lens group 700 is illustrated. In some examples, second lens element 710 is a freeform lens where the second surface 714 is non-spherical, and may have a biconic or a rotationally asymmetric shape. In other examples, first lens element 702 is a freeform lens where the first surface 704 is non-spherical, and may have a biconic or a rotationally asymmetric shape.

Generally, non freeform lens surfaces may be spherical and have any degree of curvature, which may be selected based, at least in part, by optical design that considers parameters of the other lenses and their surfaces, including any freeform surfaces.

Figure 8:
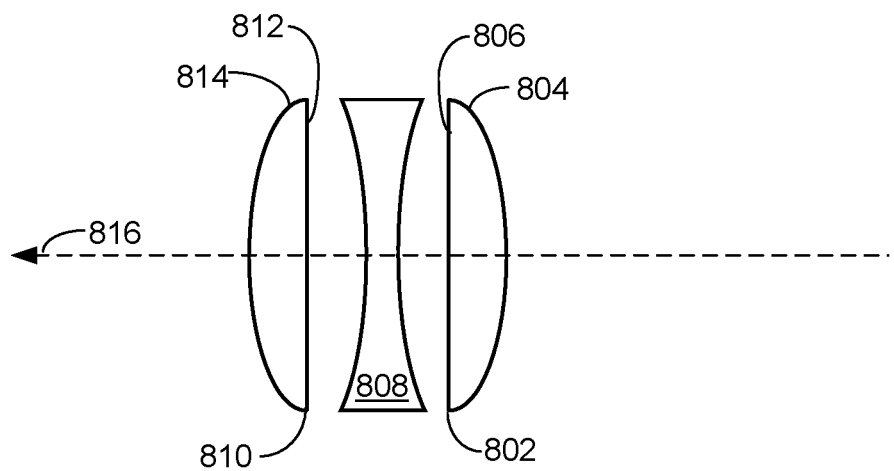

FIG. 8 illustrates a lens group 800 (e.g., a three-element lens or Cooke triplet lens) that includes a first lens element 802 having a first surface 804 and an opposite flat surface 806, a negative lens 808, and a second lens element 810 having a flat first surface 812 and a second surface 814. An optical axis 816 of lens group 800 is illustrated. In some examples, second lens element 810 is a freeform lens where the second surface 814 is non-spherical, and may have a biconic or a rotationally asymmetric shape. In other examples, first lens element 802 is a freeform lens where the first surface 804 is non-spherical, and may have a biconic or a rotationally asymmetric shape.

Lens group 800 may be similar to lens groups 700 or 600 except that the combination of lens surface curvatures and spacings separating the lens elements of the lens groups may differ.

Figure 9:
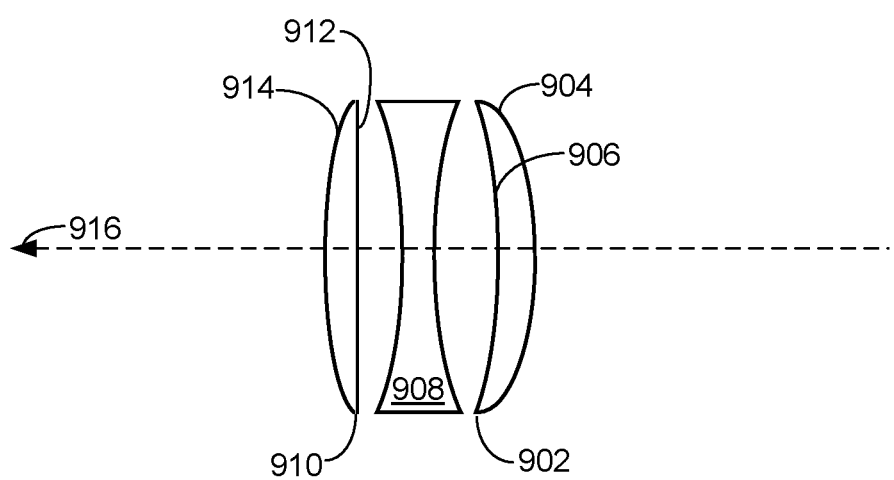

FIG. 9 illustrates a lens group 900 (e.g., a three-element lens or Cooke triplet lens) that includes a first lens element 902 having a first surface 904 and a concave second surface 906, a negative lens 908, and a second lens element 910 having a flat first surface 912 and a second surface 914. An optical axis 916 of lens group 900 is illustrated. In some examples, second lens element 910 is a freeform lens where the second surface 914 is non-spherical, and may have a biconic or a rotationally asymmetric shape. In other examples, first lens element 902 is a freeform lens where the first surface 904 is non-spherical, and may have a biconic or a rotationally asymmetric shape. Lens group 900 may be similar to lens group 800 except that second surface 906 of first lens element 902 is concave. First lens element 902, however, is a positive lens because the positive curvature of first surface 904 and the negative curvature of second surface 906 nets an overall converging collimation.

FIG. 10 is a flow diagram illustrating a process 1000 for fabricating a lens module for a LIDAR system, according to some examples. Such a lens module may be the same as or similar to 206, and may include a first Cooke triplet lens and a second Cooke triplet lens in a side-by-side configuration. In some examples, the first Cooke triplet lens may be similar to or the same as 202 and the second Cooke triplet lens may be similar to or the same as 204, as illustrated in FIG. 2. In such examples, the first Cooke triplet lens is in the emitter portion of the optical system of the LIDAR system and the second Cooke triplet lens is in the receiver portion of the optical system of the LIDAR system. Accordingly, the first Cooke triplet lens may include a freeform lens element that is capable of collimating a laser diode beam having divergence that varies in different directions (e.g., diverges in a non-constant pattern or asymmetrical pattern).

In block 1002, the first Cooke triplet lens may be placed into a first portion of a lens holder (e.g., 206) so that the first Cooke triplet lens is optically aligned with a laser diode (e.g., 304). As explained above, a beam of the laser diode diverges in a non-constant or asymmetrical pattern, such as beam illustrated in FIGS. 4 and 5. The first Cooke triplet lens includes at least one lens having a predetermined astigmatism that reduces asymmetry of the asymmetrical pattern of the beam.

In block 1004, the second Cooke triplet lens may be placed into a second portion of the lens holder so that the second Cooke triplet lens is optically aligned with a photo-detector. In some examples, placing the first Cooke triplet lens into the first portion of the lens holder and placing the second Cooke triplet lens into the second portion of the lens holder may involve aligning the second Cooke triplet lens such that an optical axis of the second Cooke triplet lens is substantially parallel to an optical axis of the first Cooke triplet lens.

In some examples, a freeform lens may be designed using digital-point technology, so that each portion of a lens may be unique. Such lens may comprise plastic or glass. In fabrication of glass lenses (and some plastic lenses), point technology generators may use a router bit-type tool guided by a computer program. This is in contrast to a grinding process typically used for spherical lens surfaces. Fabrication of plastic lenses may involve injection molding, for example. In other examples, plastic lenses may be shaped by a single-point diamond-turn process.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

Conditional language such as, among others, "can," "could," "may" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A lens assembly for a LIDAR system, the lens assembly comprising:
   a first positive lens;
   a second positive lens; and
   a third negative lens interposed between the first positive lens and the second positive lens, wherein optical axes of the first positive lens, the second positive lens, and the third negative lens are aligned with an optical axis of a laser of the LIDAR system, and wherein at least one optical surface of the first positive lens, the second positive lens, or the third negative lens is a freeform surface.

2. The lens assembly of claim 1, wherein the first positive lens, the second positive lens, and the third negative lens collectively comprise a Cooke triplet lens.

3. The lens assembly of claim 2, wherein the freeform surface is configured to apply astigmatism to collimate a beam of the laser.

4. The lens assembly of claim 1, wherein the first positive lens, the second positive lens, and the third negative lens collectively comprise a first three-element lens, the lens assembly further comprising:
   a second three-element lens, wherein an optical axis of the second three-element lens is aligned with an optical axis of a sensor of the LIDAR system, and wherein the second three-element lens is adjacent to the first three-element lens such that the optical axis of the second three-element lens is substantially parallel to the optical axis of the first three-element lens.

5. The lens assembly of claim 4, wherein a perimeter of the first three-element lens includes a truncated portion that is adjacent to the second three-element lens.

6. The lens assembly of claim 1, wherein at least one of the first positive lens, the second positive lens, and the third negative lens is a biconic lens that includes the freeform surface.

7. The lens assembly of claim 1, wherein at least one of the first positive lens, the second positive lens, or the third negative lens is a rotationally asymmetric lens that includes the freeform surface.

8. A LIDAR system comprising:
   a laser configured to emit a beam having a slow axis and a fast axis so that a cross-section of the beam has a width substantially greater than a height;
   a photodetector;
   a first three-element lens optically aligned with the laser; and
   a second three-element lens optically aligned with the photodetector,
   wherein the first three-element lens includes at least one lens having a predetermined astigmatism that reduces the width of the beam with respect to the height.

9. The LIDAR system of claim 8, wherein the at least one lens having the predetermined astigmatism is a lens having a freeform surface.

10. The LIDAR system of claim 8, wherein the at least one lens having the predetermined astigmatism is a rotationally asymmetric lens.

11. The LIDAR system of claim 8, wherein at least one of the first three-element lens and the second three-element lens is a Cooke triplet lens.

12. The LIDAR system of claim 8, wherein the at least one lens having the predetermined astigmatism is a plastic lens.

13. The LIDAR system of claim 8, wherein the laser is a laser diode.

14. The LIDAR system of claim 11, wherein the first three-element lens is adjacent to the Cooke triplet lens and an optical axis of the first three-element lens is substantially parallel to an optical axis of the second three-element lens.

15. The LIDAR system of claim 14, wherein the optical axis of the first three-element lens is folded by a first mirror between the first three-element lens and the laser, and wherein the optical axis of the second three-element lens is folded by a second mirror between the second three-element lens and the photodetector.

16. A method of fabricating a lens assembly for a LIDAR system, the method comprising:
   placing a first three-lens group into a first portion of a lens holder so that the first three-lens group is optically aligned with a laser diode, wherein a beam of the laser diode diverges in an asymmetrical pattern; and
   placing a second three-lens group into a second portion of the lens holder so that the second three-lens group is optically aligned with a photodetector,
   wherein the first three-lens group includes at least one lens having a predetermined astigmatism that reduces asymmetry of the asymmetrical pattern of the beam.

17. The method of claim 16, wherein the at least one lens having the predetermined astigmatism is a freeform lens.

18. The method of claim 16, wherein the at least one lens having the predetermined astigmatism is a rotationally asymmetric lens.

19. The method of claim 16, wherein the at least one lens having the predetermined astigmatism is a plastic lens.

20. The method of claim 16, wherein placing the first three-lens group into the first portion of the lens holder and placing the second three-lens group into the second portion of the lens holder further comprises:
   aligning the second three-lens group such that an optical axis of the second three-lens group is substantially parallel to an optical axis of the first three-lens group.

* * * * *